United States Patent
Crews et al.

(10) Patent No.: US 7,496,191 B1
(45) Date of Patent: Feb. 24, 2009

(54) INTEGRATED PRIVACY RULES ENGINE AND APPLICATION

(75) Inventors: John C. Crews, Gardner, KS (US); David Fultz, Raymore, MO (US); Srinivas Pogiri, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1140 days.

(21) Appl. No.: 10/738,763

(22) Filed: Dec. 17, 2003

(51) Int. Cl.
*H04M 7/00* (2006.01)
*H04M 1/56* (2006.01)

(52) U.S. Cl. .............. 379/220.01; 379/142.02; 379/142.05

(58) Field of Classification Search ............ 379/220.01, 379/142.02, 142.05
See application file for complete search history.

(56) References Cited

U.S. PATENT DOCUMENTS

| | | | |
|---|---|---|---|
| 6,070,244 A | 5/2000 | Orchier et al. | |
| 6,317,838 B1 | 11/2001 | Baize | |
| 6,678,516 B2 | 1/2004 | Nordman et al. | |
| 7,069,427 B2 | 6/2006 | Adler et al. | |
| 7,178,025 B2 | 2/2007 | Adler et al. | |
| 7,185,192 B1 | 2/2007 | Kahn | |
| 2001/0036224 A1 | 11/2001 | Demello et al. | |
| 2002/0026592 A1 | 2/2002 | Gavrila et al. | |
| 2002/0173295 A1 | 11/2002 | Nykanen et al. | |
| 2002/0173296 A1 | 11/2002 | Nordman et al. | |
| 2002/0184160 A1 | 12/2002 | Tadayon et al. | |
| 2003/0009385 A1 | 1/2003 | Tucciarone et al. | |
| 2003/0177376 A1 | 9/2003 | Vellaggia et al. | |
| 2003/0200463 A1 | 10/2003 | McCabe et al. | |
| 2004/0054569 A1 | 3/2004 | Pombo et al. | |
| 2004/0083367 A1 | 4/2004 | Garg et al. | |
| 2004/0128559 A1 | 7/2004 | Zurko et al. | |
| 2004/0186836 A1 | 9/2004 | Schlesinger | |
| 2004/0250120 A1 | 12/2004 | Ng | |
| 2004/0266468 A1 | 12/2004 | Brown et al. | |
| 2005/0043989 A1 | 2/2005 | Shfrin | |
| 2007/0291921 A1* | 12/2007 | Fleischer et al. ............ 379/229 |

OTHER PUBLICATIONS

Ramanujan, Anu, Patent Application entitled, "Customer Data Privacy Implementation", filed Jan. 31, 2005, U.S. Appl. No. 11/047,021.

Stone, M. Jeffrey, Patent Application entitled, "System and Methods for Dynamic Privacy Management", filed May 11, 2006, U.S. Appl. No. 11/432,188.

Office Action dated Nov. 22, 2006, U.S. Appl. No. 10/738,598, filed Dec. 17, 2003.

Final Office Action dated May 14, 2007, U.S. Appl. No. 10/738,598, filed Dec. 17, 2003.

(Continued)

*Primary Examiner*—Rasha S Al Aubaidi (57) ABSTRACT

A system and method for managing customer data is provided. The method for managing customer data includes assigning one or more roles with entities desiring access to customer data, the entities including at least one application. The method provides for determining a category associated with at least some of the customer data, determining an access level for each role based on the category associated with the at least some of the customer data, and restricting access by the application to a system maintaining the customer data based on whether the application is authorized to access the system.

23 Claims, 4 Drawing Sheets

OTHER PUBLICATIONS

Advisory Action dated Aug. 6, 2007, U.S. Appl. No. 10/738,598, filed Dec. 17, 2003.

Office Action dated Nov. 14, 2007, U.S. Appl. No. 10/738,598, filed Dec. 17, 2003.

Boydstun, K., *Security Framework Data Scheme*, filed Oct. 31, 2003, U.S. Appl. No. 10/284,809, 43 pgs., drawings (3 sheets).

Boydstun, K., *Security Framework Bridge*; filed Oct. 31, 2003, U.S. Appl. No. 10/284,680, 45 pgs., drawings (3 sheets).

Boydstun, K., *Integrated Security Framework and Privacy Database Scheme*, filed Dec. 17, 2003, U.S. Appl. No. 10/738,244, 53 pgs., drawings (3 sheets).

Fultz, David, et al., *Rules Engine Architecture and Implementation*, filed Dec. 17, 2003, U.S. Appl. No. 10/738,598, 43 pgs., drawings (4 sheets).

Karjoth, Guner, et al., "Platform for Enterprise Privacy Practices: Privacy-enabled Management of Customer Data", 2nd Workshop on Privacy Enhancing Technologies, Lecture Notes in Computer Science, Springer. Apr. 14, 2002; http://www.semper.ortg/sirene/publ.KaSW1_02.EP3P4PET.pdf.

Final Office Action dated May 12, 2008; U.S. Appl. No. 10/738,598, filed Dec. 17, 2003 (IDF 2473 [4000-13900]).

\* cited by examiner

INTEGRATED PRIVACY RULES ENGINE AND APPLICATION

CROSS-REFERENCE TO RELATED APPLICATIONS

This application is related to U.S. patent application Ser. No. 10/738,598, entitled Rules Engine Architecture and Implementation, inventors David Fultz, Kemi Y. Ibitayo and Anu Ramanujam, filed on even date herewith, which is hereby incorporated by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the management of customer data. More particularly, embodiments of the present invention manage the privacy rules that restrict access to customer data.

BACKGROUND OF THE INVENTION

Recent advances in wireless telephony technology have included capabilities for internet access, text messaging, and the creation and transmission of digital images, among other services. These services can be accessed through the use of mobile, handheld, wireless telephony devices, hereinafter referred to as handsets. Some of these technologies may require that personal data pertaining to a user of a service be maintained by the provider of the service. Such customer-related data, which might include account information, credit card information, and other private information, typically needs to be kept highly secure.

SUMMARY OF THE INVENTION

An embodiment of the invention is a method for managing customer data. The method for managing customer data includes assigning one or more roles with entities desiring access to customer data, the entities including at least one application. The method provides for determining a category associated with at least some of the customer data, determining an access level for each role based on the category associated with the at least some of the customer data, and restricting access by the application to a system maintaining the customer data based on whether the application is authorized to access the system.

In one embodiment, the method comprises identifying customer data, associating one or more roles with entities desiring access to the customer data, determining a category associated with the customer data, and determining an access level for each role based on the category associated with the customer data. The category can be one or all of a group of categories including account; authorization; communications; contact; credit; demographic; financial; location; mobile numbers; name, address, and telephone number; personally identifiable profile; non-personally identifiable profile; personally owned; preferences and subscriptions; public space; SSN/TIN; and technical data.

The role can be one or all of a group of roles including account holder; subscriber; customer; third-party application provider; wireless telephony service provider as application provider; trusted business partner of a wireless telephony service provider; wireless telephony service provider as miner of data; wireless telephony service provider as troubleshooter; wireless telephony service provider as database administrator; internal application of a wireless telephony service provider; enterprise customer/customer liable account; enterprise customer/employee liable account; enterprise customer/corporate managed-employee liable account; and law enforcement. The method further comprises identifying one or more entities for which access to customer data is to be provided, determining the roles associated with the entities, and assigning some of the entities to one of the defined roles.

An alternative embodiment is a computer-readable medium upon which a data structure is stored. The data structure includes a first field containing customer data, a second field containing data representing an entity desiring access to the customer data, a third field containing data representing an authorization level of the entity to access the customer data, and a fourth field containing data representing a category defining a portion of the customer data. The second field can further be defined as containing a role associated with one or more entities desiring access to the customer data. The role contained in the second data field can be one of a plurality of roles.

An alternative embodiment is a system for privacy management of customer data. The system includes a data store component and a data retriever component. The data store component can maintain a data store identifying customer data and an authorization level associated with the customer data. The data retriever component can receive an application request for customer data and determine whether to provide the requested customer data to the application based on a role related to the application and the authorization level associated with the requested customer data.

The data store can further identify a category associated with the customer data and the authorization level can be associated with the category. The role can further be defined as a classification role of an entity desiring to receive customer data. The authorization level can be associated with the role and can be based on the category and the role. The system may further include a security parameter related to securing the customer data on a system and a retention parameter related to retention of the customer data. The system may also include a network authentication system to authenticate the application for access to a network in which the data store is located.

The application can be associated with a service. The data retriever component can determine whether to provide the requested customer data to the application based on the role related to the service of the application. The data retriever component can further determine whether to provide the requested customer data to the application based the service of the application. The data retriever component can further determine whether to provide the requested customer data to the application based on the role related to the application.

DETAILED DESCRIPTION OF THE PREFERRED EMBODIMENTS

Wireless telephony technologies that have recently emerged or are proposed include push-to-talk services and location-based services. A user of a push-to-talk service can directly communicate with another user of the same service in a manner similar to communication by walkie-talkie. That is, if two users have agreed to send and receive verbal communications with each other through a push-to-talk service, one user can simply push a button on a handset and immediately begin speaking to the other user without the need for the other user to perform any action. Similarly, a group of more than two users may agree to communicate in such a manner. By pressing a button on a handset a user can communicate with all members in the group simultaneously. Each member of the group can have a personal identification number by means of which the member can be contacted by other members of the group.

Handsets are typically capable of maintaining within an internal memory a list of personal identification numbers of individuals with whom the owner of the handset can communicate in the push-to-talk manner. A list such as this is commonly referred to as a "buddy list". A buddy list as a whole or subsets of a buddy list also might have identification numbers by means of which one member of a group can simultaneously contact all other members of the group or a subset of all the members.

Location-based services are functions or features that can be customized based on the geographic location of a subscriber to a wireless telephony service. For example, a handset might be used to request a map of the vicinity of a subscriber's current location. Hardware and/or software (such as a global positioning system) within the device might have the capability to establish the latitude and longitude of its current location. A subscriber to a mapping service could use the handset to send the location to the mapping service and the service could respond with a map of the area. Another example of a location-based service might be the sending of coupons based on a customer's location. A user might wish to subscribe to a service through which discount coupons for merchandise or services are automatically transmitted to the user's handset when the user passes within a pre-defined distance of a favorite merchant or a favorite type of business.

A data store such as a relational database or a directory might be used by a service provider to store the data needed by push-to-talk services, location-based services, or other services available through a handset. For example, the identification numbers used to contact members of a buddy list might be kept in a data store for customer data. Also, a customer data store might be used to store the names of the favorite merchants of a subscriber to a location-based coupon service. Data stores that hold data used by services accessible through a handset are typically kept secure to protect private customer information. For example, a subscriber to a location-based coupon service may want a favorite merchant to know his current location, but typically would not want others to have that information. Thus, the subscriber's location would typically be kept in a secure customer data store.

A subscriber to a location-based coupon service would typically be allowed to create customized policies to specify the types of merchants that the subscriber wants to receive coupons from, how close the subscriber must be to a favorite merchant for a coupon to be sent, and other customizable features. Policies might also be used to control access to push-to-talk communication services. For example, an individual might wish to limit the people who can contact him through a buddy list. Policies such as these that implement restrictions regarding access to customer data might be embodied in software routines that can be stored in a permissions data store. This data store might be the same as or different from the data store used to store the customer data itself.

In addition to the policies individual subscribers might wish to implement to control the services they receive through handsets, other more general guidelines and regulations might restrict access to customer data. For example, companies that provide services through handsets would typically need to maintain private information about their customers, including account information, billing information, credit card information, and other sensitive data. Such companies might enter into agreements with customers on how private customer data is to be used and protected. To fulfill the agreements, the companies might implement internal policies that require that such information be kept in a secure data store and that specify which entities are allowed access to which elements of private customer data.

Government regulations and other legal requirements might also specify how private customer data is to be maintained. For example, in a document entitled "Fair Information Practices in the Electronic Marketplace", the Federal Trade Commission (FTC) has set forth the four guiding privacy principles of notice, choice, access, and security. To fulfill the notice element of these guidelines, an enterprise might adopt policies stipulating that only those elements of personally identifiable information that are necessary to enable transactions should be provided or collected, that the default should be towards customer anonymity and the use of pseudonyms, and that profiling should be done only anonymously or under a pseudonym and only with the consent of the customer. In fulfilling the choice element, an enterprise might adopt the following policies: (a) when personally identifiable information is collected, the customer must be in complete control over how, when, and where the information is used; (b) the customer must be in complete control over how, when, and where location and presence information is used; (c) the customer must be in complete control over how, when, and where transaction information is used; (d) the customer must have an easy and efficient mechanism of control; and (e) the customer must have an easy and efficient mechanism to change privacy settings, choices, and rules. The access element can be fulfilled with a policy stating that a customer's complete profile must be made available to the customer at all times. To comply with the security element, an enterprise might adopt policies stating that all requests for location and presence information must pass through a network provider and that maximum security should be provided on any server that hosts personally identifiable information.

Among other laws and regulations addressing customer data privacy, the Federal Communications Commission (FCC), under the Telecommunications Act, regulates Customer Proprietary Network Information, including customer usage data and location information. The FTC enforces the Children's Online Privacy Protection Act (COPPA) as well as numerous consumer protection laws. The FTC also enforces the Gramm-Leach-Bliley Act, which places privacy obligations on entities dealing with certain types of consumer financial information. The Department of Health and Human Services enforces certain statutes, such as the Health Insurance Portability and Privacy Act, which place privacy and security obligations not only on health care providers but also on companies that have business relationships with health care providers.

Any enterprise that collects private customer data would typically need to implement policies that ensure compliance with all of these various restrictions. These policies can be embodied in software routines that automatically enforce the restrictions whenever any attempt to retrieve private customer data is made. The regulations, guidelines, policies, customer preferences, and other restrictions that limit access to private customer data can be referred to generically as privacy constraints. A software routine that implements a privacy constraint can be referred to as a privacy rule. Each data element in a data store of customer data typically has one or more privacy rules associated with it describing the constraints on access to the data element. A data store in which privacy rules are maintained and the associated hardware and software for retrieving and applying an appropriate privacy rule can be referred to collectively as a rules engine. The portion of the rules engine that retrieves and applies privacy rules can be referred to as a data retriever.

The present disclosure is not the privacy policy or system for implementing customer data privacy of any particular organization and should not be relied on by any customer with regard to protection of the customer's personal information. Further, the present disclosure should not be relied on for satisfying any legal requirements regarding consumer or customer data privacy protection, nor should anything in this disclosure be considered the opinion, interpretation, or recommendation for implementation of customer data privacy by or for any organization or company. The present disclosure is merely illustrative of one type of system that could be employed by an organization for these purposes.

Figure 1:
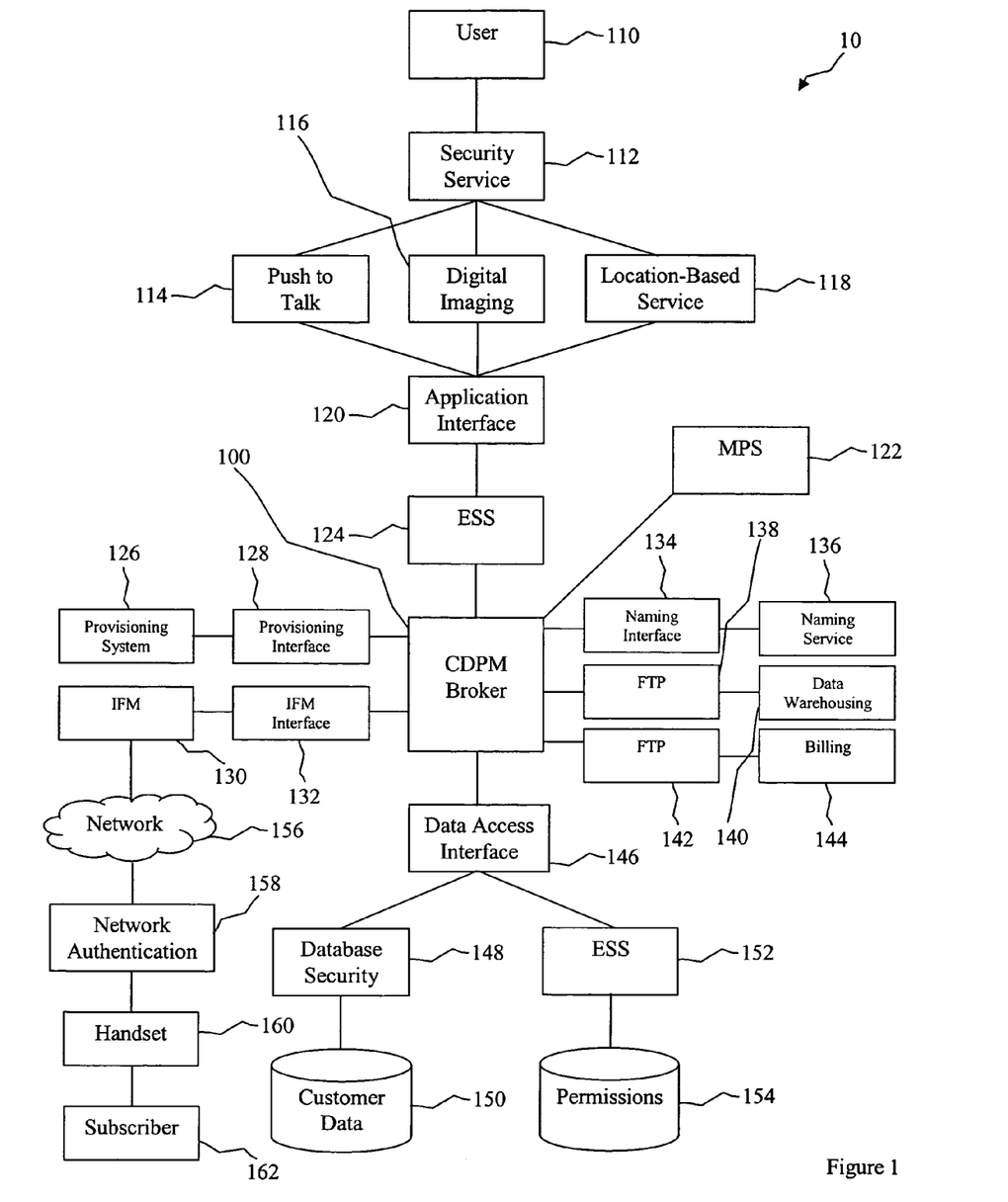
FIG. 1 is a block diagram of a customer data privacy management system.

An enterprise might use a customer data privacy management system to implement the privacy rules and protect private customer data. A block diagram of such a customer data privacy management (CDPM) system is shown in FIG. 1. A CDPM broker 100 brokers the flow of information through the customer data privacy management system 10. Three wireless telephony services, a push-to-talk service 114, a digital imaging service 116, and a location-based service 118, are shown but other services such as an internet access service, a text messaging service, a gaming service, a ringtone service, or a personalized web page service could be present. These services can also be referred to as applications or, alternatively, the applications can be thought of as the providers of the services. Other systems, services, and programs may also be employed and used for the present purposes, such as bill insert coupons and other third-party promotion and partnering arrangements, for example.

Customer information is not accessed directly by the wireless telephony services 114, 116, or 118, but is accessed through the CDPM broker 100. A user 110 wishing to use one of the applications 114, 116, or 118 to access customer data must pass through a security service 112. The security service 112 is a web-tier, rather than data-level, security layer that determines whether a user 110 is allowed access to a particular application. All of the wireless telephony applications 114, 116, and 118 communicate with the CDPM broker 100 through a common application interface 120. An enterprise security service (ESS) 124 between the application interface 120 and the CDPM broker 100 ensures that only legitimate services have access to the CDPM broker 100. The ESS 124, and in some embodiments, the security service 112, may be viewed as a first level of security.

External services or applications that might be needed by the wireless telephony services 114, 116, or 118 are brokered through the CDPM broker 100. In the embodiment of FIG. 1, a provisioning system 126 communicates with the CDPM broker 100 through a provisioning interface 128. The provisioning system 126 allows information about the purchaser of a handset to be automatically sent to the CDPM broker 100. An interface manager (IFM) 130 communicates with the CDPM broker 100 through an IFM interface 132. The IFM 130 allows communication to occur between the CDPM broker 100 and an external network 156 such as the internet.

A naming service 136 communicates with the CDPM broker 100 through a naming interface 134. The naming service 136 is a directory service through which the CDPM broker 100 registers itself, thereby allowing other applications to find the CDPM broker 100. User account information can be stored in a data warehousing system 140. The data warehousing system 140 may be used by applications other than the CDPM system 10 and therefore may contain customer information that is not relevant to the CDPM system 10. This information may be updated periodically by agents outside the CDPM system 10.

Customer information that is relevant to the CDPM system 10 is maintained in a data store for customer data 150. When a change occurs in the data warehousing system 140 to data that is relevant to the CDPM system 10, the modified data is sent from the data warehousing system 140 to the data store for customer data 150 via the CDPM broker 100. The data warehousing system 140 communicates with the CDPM broker 100 through an FTP connection 138. A billing system 144 communicates with the CDPM broker 100 through an FTP connection 142.

Data used by the wireless telephony services 114, 116, and 118 is stored in a data store for customer data 150 and a permissions data store 154. The data stores 150 and 154 could be relational databases or could be directories compliant with a directory protocol such as the Lightweight Directory Access Protocol (LDAP) or its successors. Communication between the CDPM broker 100 and the data stores 150 and 154 occurs through a data access interface 146. If the data stores 150 and 154 are relational databases, communication between the data access interface 146 and the data stores 150 and 154 might occur by means of a relational database management system.

Security systems are present between the data access interface 146 and the data stores 150 and 154 to prevent unauthorized access to data. For a relational database, the database's internal security system 148 protects the data in the customer data store 150. A second enterprise security service (ESS) 152 protects the permissions data store 154 and may, in the present embodiment, be viewed as a second level of data security.

The customer data store 150 might contain private customer information such as account information or credit card information as well as less secure data. The permissions data store 154 contains privacy rules regarding how the data in the customer data store 150 is to be managed. These rules implement the various government regulations, company policies, and customer preferences that restrict access to private customer data. For example, the permissions data store 154 might contain privacy rules regarding which merchants have permission to send a coupon to a subscriber to a location-based coupon service. The permissions data store 154 might also contain privacy rules regarding which members of a group can add themselves to a user's buddy list, who can access information about a member of a group, or who is allowed to create other rules regarding buddy lists. Privacy rules that implement the FTC's fair information practices and other legal guidelines might also be stored in the permissions data store 154.

A subscriber 162 to one of the wireless telephony services 114, 116, or 118 can access the service through a handset 160. A network authentication system 158 authenticates the handset 160 and upon authentication the subscriber 162 is connected to a network 156, typically the internet. The IFM 130 receives information about the subscriber 162 and the requested service from the network 156 and sends the information to the CDPM broker 100 via IFM interface 132. The CDPM broker 100 queries the permissions data store 154 to determine if the subscriber 162 is authorized to access the requested service. Upon authorization, the subscriber 162 can gain access to the wireless telephony service 114, 116, or 118.

A location-based service 118 might not have an internal capability to determine the mobile location of a subscriber 162 to the service. Instead, a location-based service 118 might make use of an external positioning application. Such an application, shown in FIG. 1 as a mobile positioning system or MPS 122, can communicate directly with the CDPM broker 100. When a request is made to learn the mobile location of a subscriber 162 to a location-based service 118, the location-based service 118 sends the request to the CDPM broker 100. The CDPM broker 100 accesses the customer data and permissions data stores 150 and 154 to determine if the requester is authorized to know the position of the subscriber 162. If the requester is authorized, a certificate is created and returned to the CDPM broker 100. The CDPM broker 100 then sends the certificate to the MPS 122 and requests the location of the subscriber 162. The MPS 122 returns the location of the subscriber 162 to the CDPM broker 100, which then returns the location to the location-based service 118.

An individual subscriber 162 to a push-to-talk service 114 would typically not manually enter all the names and personal identification numbers of all members of his buddy list into his handset 160, especially when the list is large. Instead, an account representative might create the buddy lists for all members of a group by means of a web browser. In FIG. 1, the generic user 110 can assume the function of account representative. In other embodiments, the user 110 can perform other functions, as described below. The account representative typically uses a web browser to navigate to a web page from which buddy lists can be created and modified. The web page might require that the account representative pass through the security service layer 112 to establish authentication and authorization. Upon being authenticated and authorized, the account representative can create the appropriate buddy lists and load them into the customer data store 150 via the CDPM broker 100.

An enterprise would typically allow only an account representative to access buddy lists through a web browser; individual subscribers 162 to a push-to-talk service 114 would typically update their buddy lists through their handsets 160. However, in some embodiments, subscribers 162 might be allowed to use a web browser to access their buddy lists.

Buddy list information that is stored in the customer data store 150 is not directly available to a push-to-talk service subscriber 162. Changes made in the customer data store 150 to buddy list data typically need to be transferred to the subscriber's 162 handset 160 in order to be available to the subscriber 162. Similarly, changes made to a buddy list in a handset 160 typically need to be transferred to the customer data store 150. The interface manager 130 handles the transfer of this data between the handset 160 and the CDPM broker 100. The CDPM broker 100 sends the data to and receives the data from the customer data store 150.

Several examples can illustrate the manner in which the customer data privacy management system 10 can restrict access to private customer data by, for example, wireless telephony services. In one example, a user 110 may attempt to learn the location of a subscriber 162 to a location-based service 118. For instance, a parent may wish to learn the location of a child carrying a handset 160 with location-based service capabilities. Alternatively, an employer might wish to learn the location of an employee. The parent, the employer, or, generically, the user 110 first uses a web browser to navigate to a web site where access to the location-based service 118 can be requested. The user 110 enters an identification name or number and a password into a graphical user interface that appears on this page and the identification and password are then passed to the web-tier security service layer 112. The security service layer 112 checks the identification and password to authenticate the user 110 and determine if the user 110 is authorized to use the location-based service 118. If the user 110 is authorized, the location-based service 118 displays a graphical user interface that allows the user 110 to enter the name of the person whose location the user 110 is trying to learn.

The location-based service 118 passes the identities of the user 110 and the person the user 110 is trying to locate through the application interface 120 to the ESS 124. The ESS 124 checks identifying information about the location-based service 118 to ensure that it is a legitimate, authorized application rather than an impostor program attempting to gain unauthorized access. For instance, the ESS 124 might check port or socket information related to the application, or the IP or Internet Protocol address of the requesting application. Upon approval of the location-based service 118, the identities of the user 110 and the person the user 110 is trying to locate are passed through the CDPM broker 100 and the data access interface 146 to the permissions data store 154. The second ESS 152 is typically used to prevent unauthorized changes to the permissions data store 154 and is not involved, in the present embodiment, in a simple query to the permissions data store 154.

The permissions data store 154 contains rules regarding who is allowed to learn the location of a subscriber 162 to a location-based service 118. For instance, a subscriber 162 who wants the highest level of privacy might specify that his location is not to be made available to anyone. Subscribers 162 who provide handsets to their children might wish to know the locations of their children at all times, but typically would not want others to know the locations of their children. Such subscribers 162 might specify that the children's locations always available to the subscribers 162 but never available to anyone else.

A subscriber 162 to a location-based service 118 might make his location available only to specified merchants. The subscriber 162 might use either an opt-in or an opt-out method to specify which entities are allowed to learn his location. In the opt-in method, a subscriber 162 specifies the entities that are allowed access to his location information and all other entities are denied access. In the opt-out method, entities are given access to the subscriber's 162 location information by default and the subscriber 162 specifies those entities whose access is to be revoked. While the opt-in and opt-out methods are described here in the context of a location-based service 118, these methods can apply to any feature of any wireless telephony or other service. Rules that implement the opt-in and opt-out methods can be referred to generically as customer-selectable rules.

In various embodiments, the privacy rules specified by a subscriber 162 might be entered into the CDPM system 10 by means of a handset 160, a standard telephone, a computer, or other means. For example, a subscriber 162 could use a handset 160 or a standard telephone to depress buttons on a touchpad in response to an automated voice menu, to provide voice commands in response to an automated voice menu, or to speak to a human service representative. Alternatively, a subscriber 162 could use a graphical user interface on a handset 160 or a computer to select menu items or buttons or to enter text into a form. Also, a paper form specifying privacy rules could be submitted to a service provider. A rule can be created by selection from a set of standardized rules, by selection of a set of opt-in and opt-out choices, by manual entry of text, or by other procedures.

An entity seeking to learn a subscriber's 162 location might be an individual, a company, a sub-group within a company, or some other group of individuals. Alternatively, when an individual or group filling a particular role requests a subscriber's 162 location, the role can be thought of as the requesting entity. In the example of a user 110 seeking the location of a subscriber 162 to a location-based service 118, numerous rules would typically be present in the permissions data store 154 specifying the entities and roles that are allowed to learn the subscriber's 162 location. At least one of these rules would apply to the user 110, typically either as an individual, as a member of a group to which the user 110 belongs, or as a role that the user 110 is filling. When no rules apply specifically to the user 110, a default rule may be used.

The permissions data store 154 searches for the rule that applies to the user 110 and the subscriber 162, determines a yes-or-no response as to whether the user 110 is allowed to learn the subscriber's 162 location, and returns the response to the CDPM broker 100. In the case of a "yes" response, the CDPM broker 100 queries the mobile positioning system (MPS) 122 for the subscriber's 162 location. The MPS 122 determines the subscriber's 162 geographic location and returns that information to the CDPM broker 100. The CDPM broker 100 sends the location to the location-based service 118 which then returns it to the user 110 via a web-based graphical user interface.

In another example of a location-based service 118, a subscriber 162 may wish to add a merchant to the list of merchants who are allowed to send discount coupons to the subscriber 162 when the subscriber 162 is within a certain distance of one of the merchant's stores. In variations of this example, the subscriber 162 may specify a generic type of business rather than a specific merchant or specific store. Also, other types of contact besides the sending of coupons may be desired. For instance, a subscriber 162 may wish to be notified when in the vicinity of any ice cream shop, regardless of the specific brand of ice cream and regardless of whether the shop is offering any promotions.

In any of these variations, the subscriber 162 would typically enter into the handset 160 the name of the merchant or the type of business and other information regarding how and when the subscriber 162 wishes to be contacted. The network authentication system 158 then authenticates the identity of the subscriber 162 and determines if the subscriber 162 is authorized to access the network 156. Upon authorization, the subscriber 162 is connected, via the network 156, the IFM 130, and the IFM interface 132, to the CDPM broker 100. Using the information entered by the subscriber 162, the CDPM broker 100 updates the customer data store 150 and/or the permissions data store 154 as appropriate.

For instance, the specified merchant may be added to a list in the customer data store 150 of merchants who are allowed to learn the subscriber's 162 location. If such a list does not yet exist, it can be created at this point. A rule in the permissions data store 154 stating which merchants are allowed to learn the subscriber's 162 location is updated if necessary. Other rules that might be updated or created in the customer data store 150 or the permissions data store 154 include a distance from the merchant within which the subscriber 162 wishes to be contacted, the circumstances under which the subscriber 162 wishes to be contacted, and the type of information the subscriber 162 wishes to receive from the merchant. The permissions data store 154 might also contain a rule that allows the subscriber 162 to use the handset 160 to temporarily opt in and opt out of the location-based service 118.

Before the information entered by the subscriber 162 into the handset 160 is actually entered into the data stores 150 and 154, the information may have to pass through the database security system 148 and the second enterprise security service 152. These systems 148 and 152 ensure that the subscriber 162 is authorized to make the requested changes to the data stores 150 and 154.

In order for a location-based service 118 to function properly, the service 118 needs to receive regular updates on the location of a subscriber 162 to the service 118. Permission to receive these updates can be stored in the permissions data store 154 when the subscriber 162 subscribes to the service 118. That is, a rule might be placed in the permissions data store 154 that gives the CDPM broker 100 permission to make frequent, periodic requests to the MPS 122 for the subscriber's 162 location. Upon receiving responses from the MPS 122, the CDPM broker 100 might regularly update the customer data store 150 with the location information. Another rule in the permissions data store 154 might allow the location-based service 118 to retrieve the location information from the customer data store 150 at any time.

Alternatively, instead of sending the location information to the customer data store 150, the CDPM broker 100 might send the information directly to the location-based service 118. In either case, the location-based service 118 examines the subscriber's 162 current location and compares it to the locations of the stores of the merchant from which the subscriber 162 would like to receive discount coupons. If the subscriber 162 is within the distance to the store defined in the customer data store 150 or the permissions data store 154 and if the other applicable rules in the permissions data store 154 are met, a coupon is sent to the subscriber 162.

A third way in which the CDPM system 10 controls access to private data can be illustrated in an example of a subscriber 162 to a push-to-talk service 114 updating a buddy list. A subscriber 162 wishing to add an individual to the subscriber's 162 buddy list enters the individual's name, mobile phone number, or other identifying information into the handset 160. From the handset 160, the information passes through the network authentication system 158, the network 156, the IFM 130, and the IFM interface 132 to the CDPM broker 100 in the manner described above. The CDPM broker 100 places the identifying information of the individual to be added to the buddy list into the customer data store 150 after the database security system 148 ensures that the subscriber 162 is authorized to make the addition. The CDPM broker 100 makes the appropriate changes to the permissions data store 154 after the second ESS 152 ensures that the subscriber 162 is authorized to make the changes.

A subscriber 162 wishing to block an individual currently on the subscriber's 162 buddy list from contacting the subscriber 162 through the push-to-talk service 114 is able to make such a change through the handset 160. As above, the subscriber 162 enters identifying information about the individual to be blocked into the handset 160 and this information is passed to the CDPM broker 100. The CDPM broker 100 then makes appropriate changes to the permissions data store 154 so that permission for the individual to contact the subscriber 162 through the push-to-talk service 114 is revoked. Alternatively, the CDPM broker 100 could remove the individual's name from a list in the customer data store 150 of individuals who are allowed to contact the subscriber 162 through the push-to-talk service 114.

Once a subscriber's 162 buddy list has been established in the customer data store 150, rules regarding the buddy list have been established in the permissions data store 154, and the internal memory of the subscriber's 162 handset 160 has been loaded with the subscriber's 162 buddy list, the CDPM system 10 is needed only for changing data in the data stores 150 and 154. The subscriber 162 can make calls through the push-to-talk service 114 without the need for further authorization or any further interaction with the CDPM system 10.

The above examples are intended to illustrate some of the ways in which the CDPM system 10 brokers the information used by wireless telephony services. Wireless telephony services other than those described could use the system, external applications other than those described might be used by the wireless telephony services, different interfaces and security systems could be present, and information could flow through the CDPM system 10 through pathways different from those described. The various examples of implementations of privacy rules for wireless telephony services, such as location-based services and push-to-talk services, are provided for the purpose of illustration. This discussion is not limited to these types of systems or services and may apply to any system or service where customer data privacy is a consideration.

Despite the potential variations in the overall CDPM system 10, a common method and system can be used for managing the data in the customer data store 150 and the permissions data store 154. Specifically, each element of customer data that might be used by the CDPM system 10 can be placed in a category of related data elements. Entities that might need access to customer data can be assigned roles. A single set of roles can be created that covers all possible entities that might need access to the customer data. Each role can be given a specific level of access to each category of data. A given role might have the same level of access to all data elements in a given category but might have a different level of access to the data in a different category. Thus, an authorization level can be associated with each data element describing which roles are allowed access to the data element.

Figure 2:
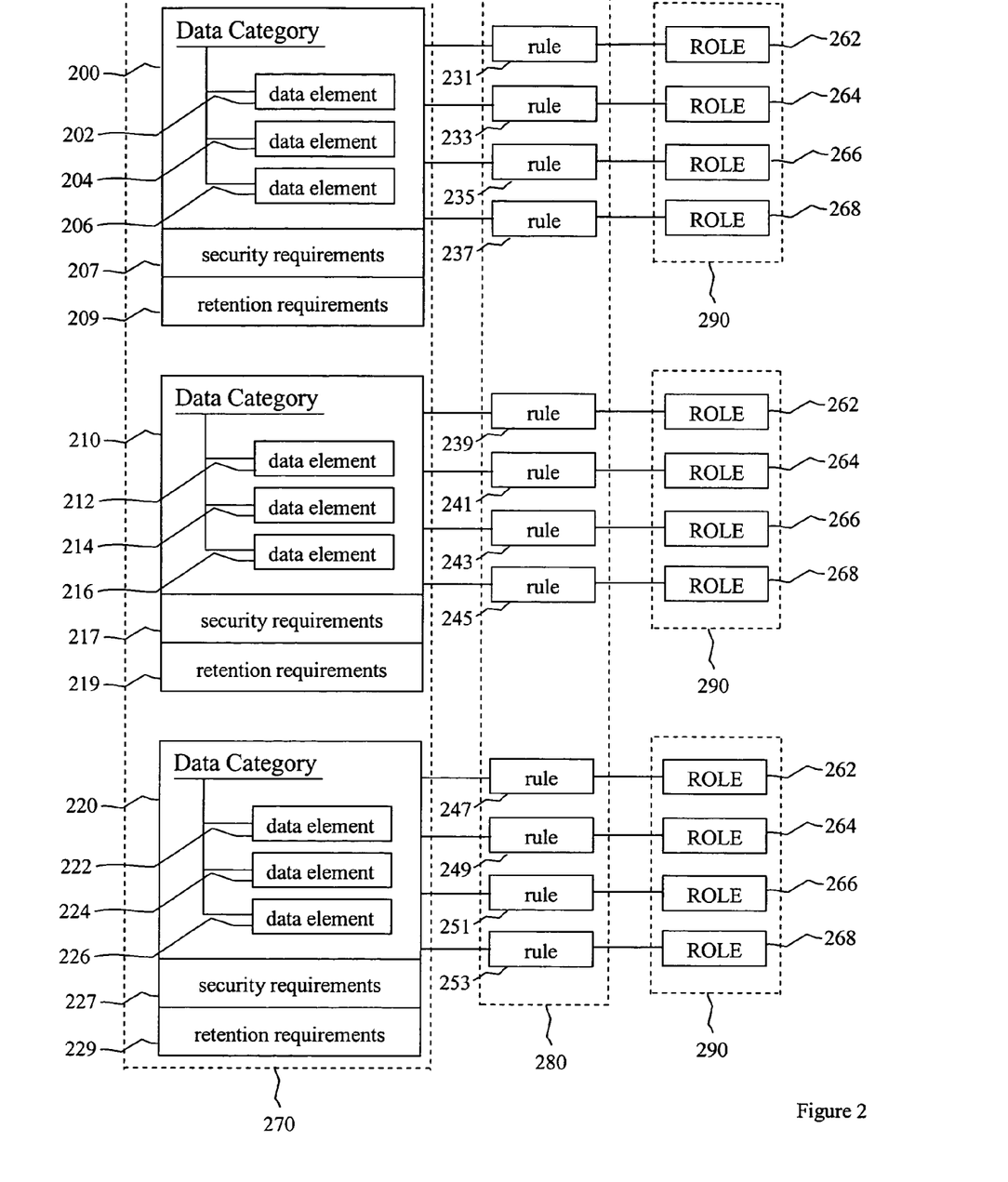
FIG. 2 is a block diagram of an arrangement of customer data and permissions data.

An embodiment of this method and system for managing customer data is shown in FIG. 2. Three data categories 200, 210, and 220 are shown but other numbers of categories of data could be present. Data elements 202, 204, and 206 are present in data category 200, data elements 212, 214, and 216 are present in data category 210, and data elements 222, 224, and 226 are present in data category 220. While three data elements are shown in each data category, other numbers of data elements could be present. Each data element in the figure is labeled with a different number to reflect the fact that each element is unique and belongs to only one category.

Roles 262, 264, 266, and 268 are also shown in FIG. 2. The roles 262, 264, 266, and 268 have the same label numbers in each set 290 of roles to indicate that the same set 290 of roles is associated with each data category 200, 210, and 220. A set of rules 231, 233, 235, 237, 239, 241, 243, 245, 247, 249, 251, and 253 specifies the level of access each role 262, 264, 266, and 268 has to the data in each data category 200, 210, and 220. For example, rule 231 specifies the level of access role 262 has to the data in category 200, rule 241 specifies the level of access role 264 has to the data in category 210, and rule 251 specifies the level of access role 266 has to the data in category 220.

In an example, a location-based service provider might place customer data into two categories, account data and location data. In FIG. 2, account data might correspond to data category 200 and location data might correspond to data category 210. Data elements in the account category might include customer name, customer account number, and customer credit card number, which might correspond to data elements 202, 204, and 206, respectively. The only data element in the location data category might be the customer's current location, which might correspond to data element 212.

Continuing the example, the location-based service provider might specify that only three entities are allowed access to customer data. These entities might be the service provider itself, the customer, and a third-party vendor, which, in FIG. 2, might correspond to roles 262, 264, and 266, respectively. A rule stating that the service provider is always allowed access to data in the customer data category might correspond to rule 231 stating that role 262 is always allowed access to data category 200. A rule stating that the customer is allowed access to data in the customer data category only with the permission of the service provider might correspond to rule 233 stating that role 264 is allowed access to data category 200 only with the permission of the service provider. A rule stating that the third-party vendor is never allowed access to data in the customer data category might correspond to rule 235 stating that role 266 is never allowed access to data category 200.

Similarly, a rule stating that the service provider is never allowed access to data in the customer location category might correspond to rule 239 stating that role 262 is never allowed access to data category 210. A rule stating that the customer is always allowed access to data in the customer location category might correspond to rule 241 stating that role 264 is always allowed access to data category 210. A rule stating that the third-party vendor is allowed access to data in the customer location category only with the permission of the customer might correspond to rule 243 stating that role 266 is allowed access to data category 210 only with the permission of the customer.

It can be seen that, for a given data category, the number of rules is equal to the number of roles and is independent of the number of data categories or the number of data elements in a data category. That is, for each data category, a rule exists specifying the level of access a given role has to the data in that category and, for each role, a rule exists specifying the level of access the role has to a data category. Thus, the total number of rules equals the number of roles multiplied by the number of data categories.

In addition to the role-related privacy rules, each data category can have an associated set of security requirements and data retention requirements. These are shown in FIG. 2 as security requirements 207 and retention requirements 209 for data category 200, security requirements 217 and retention requirements 219 for data category 210, and security requirements 227 and retention requirements 229 for data category 220. The security requirements 207, 217, and 227 specify the level of confidentiality given to data categories 200, 210, and 220, respectively, so that customer information in the category is protected against disclosure to unauthorized personnel. Examples of security classifications include public, internal use only, restricted, and highly restricted. These security requirements 207, 217, and 227 are not directly related to the role-related privacy rules and do not change the access rights and restrictions stipulated by those rules.

The security requirements 207, 217, and 227, in the present embodiment, may include storage requirements and transmission requirements. The storage requirements outline how the data will be secured when stored, such as whether or not the data will be encrypted, the type or level of encryption. The In additions, in another embodiment, the security requirements 207, 217, and 227 may include the levels of authentications necessary for access to the data. The transmission requirements, in this embodiment, may include the requirements for securing the customer and related data during transmission from point-to-point. For example, the transmission requirements may provide that certain data is not encrypted when transmitted, while other data must be encrypted when transmitted. The levels of authentication may include, for example, whether or not a password and user name required to the data, and/or whether additional authentication is necessary. Where additional authentication is necessary, a digital certificate or other increased level of security and authentication may be required, such as in the case of highly sensitive or private customer information. It will be apparent to one skilled in the art, in view of the present disclosure, to employ these or other variations or combinations of the storage requirements, transmission requirements, and authentication to secure the data. The data retention requirements 209, 219, and 229 specify how long the information in data categories 200, 210, and 220, respectively, must be kept.

In FIG. 2, group 270 contains all of the data categories that comprise a complete set of customer data. Group 280 contains all of the rules that specify the levels of access to the data categories. Group 290 contains all of the roles that are allowed access to customer data. It can be seen that the same group of roles 290 applies to each data category 200, 210, and 220.

In an embodiment, the customer data in group 270 is stored in a customer data store (150 in FIG. 1) and the rules in group 280 are stored in a permissions data store (154 in FIG. 1). The names and definitions of the roles in group 290 can be stored in a separate data store, in a simple file, or elsewhere. Alternatively, the rules in group 280 and the roles in group 290 can be stored together in the permissions data store (154 in FIG. 1).

Figure 3:
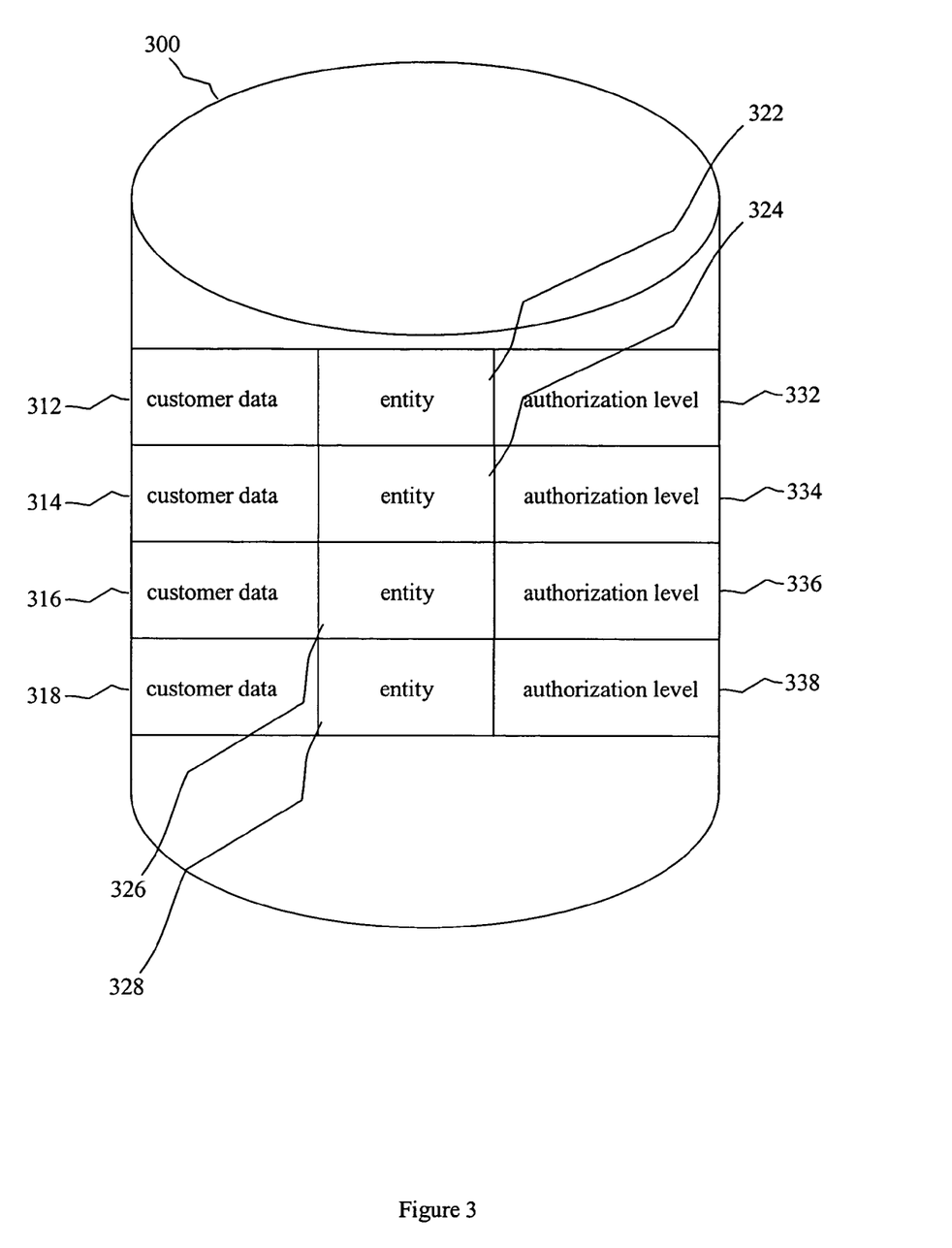
FIG. 3 is a block diagram of a computer-readable medium containing customer data and permissions data.

In another alternative, the customer data in group 270, the rules in group 280, and the roles in group 290 can be stored in a single data store. An embodiment of this alternative is illustrated in FIG. 3. A data store or other computer-readable medium 300 contains multiple fields of data. One set of fields 312, 314, 316, and 318 can contain customer data. Another set of fields 322, 324, 326, and 328 can list entities or roles that might request access to the customer data. Another set of fields 332, 334, 336, and 338 can specify the authorization levels that the entities have to gain access to the customer data. While only four fields each of customer data, entities, and authorization levels are shown in FIG. 3, other numbers could be present. However, there is typically a one-to-one-to-one correspondence between the customer data, entities, and authorization levels. That is, for each element of customer data, each entity typically has a specific authorization level. Other arrangements of data may be used to achieve the privacy concerns so long as the relationships are maintained to associate the authorization levels with the appropriate customer data.

FIG. 3 depicts the customer data, entity information, and authorization level information in a single physical location, but other embodiments are possible. For example, the customer data could be located in a first data store, the entity information could be located in a second data store, and the authorization level information could be located in a third data store. As long as some means exists to correlate an authorization level with each element of customer data and each entity, the customer data, entity information, and authorization level information can be in different physical locations.

The authorization levels stored in fields 332, 334, 336, and 338 in FIG. 3 can be considered equivalent to the rules 231, 233, 235, 237, 239, 241, 243, 245, 247, 249, 251, and 253 in FIG. 2. These rules or authorization levels enforce the various privacy constraints that might apply to customer data. As described above, the privacy constraints may include government regulations, company policies, customer-specified restrictions, and other limitations. For example, government regulations can include FCC and FTC rules. Company policies might include a corporation's internal guidelines on dealing with the access of third-party vendors to customer data. Customer-specified restrictions can include a customer's preferences for limiting access to information about his geographic location.

These privacy constraints can be embodied in software routines and stored on a computer-readable medium. This allows a single repository to hold all of the rules that restrict access to an element of customer data. Whenever any entity attempts to retrieve an element of customer data, a rule regarding the level of access of the entity to the data element can be retrieved from this single repository, regardless of whether the original source of the rule was a legal constraint, a company policy, a customer preference, or some other source.

In an embodiment, the categories of data are account; authorization; communications; contact; credit; demographic; financial; location; mobile numbers; name, address, and telephone number; personally identifiable profile; non-personally identifiable profile; personally owned; preferences and subscriptions; public space; SSN/TIN; and technical data. Examples of the type of customer data that might be found in the account category include an account identifier, a payment amount, a payment date, a payment due date, a payment method, a processing timestamp, and a subscriber identifier. The authorization category might include data elements such as an access denied code, which indicates a "locked" or "unlocked" status of a customer; an opt-in field indicating whether a customer has opted in to a service; an opt-out field indicating whether a customer has opted out of a service; a password; a permission field that indicates the authority a customer has given others to perform actions on his behalf or control his personal data; a Personal Identification Number that a customer can use in the manner of a password; a security prompt the customer can be asked in order for the customer to be allowed access to account information; a security response to be provided by the customer in reply to the security prompt; a terms and acceptance field indicating that the customer has accepted the terms and conditions of a service agreement; and a user ID, which is the name by which a user is identified on a computer network.

Examples of data in the communications category include an alert field, which is a one-way message notifying a customer of an event of importance such as an upcoming birthday; an email field, which contains emails sent to a customer; an instant message field, which contains instant messages sent to a customer; a push content field, which contains one-way messages sent to a customer from a service provider such as a location-based coupon provider; a short mail field, which contains text strings sent from one person to another via the World Wide Web; and a voicemail field, which stores voice messages received by a customer. Data elements in the contact category might include an alias name, which is an alternative name a customer might choose to use for various purposes; a network access identifier, which is a unique identifier a customer might use to gain access to a computer network; and a subscriber email address, which is the text string used to send email to a customer. The credit category might include data elements such as an accounts receivable scrubber data field that defines the allowable payment methods available to a customer and a credit class field that defines the credit worthiness of a customer. The demographic category might include age, birth date, body height, and gender data elements.

Examples of data in the financial category include an accounts receivable accept/reject code used to specify if a payment was accepted, an ACH acceptance agreement field that indicates whether a customer has accepted the use of the Automated Clearing House for invoice payment, a bank account number, a bank transit number, a credit card billing address, a credit card billing name, a credit card expiration date, a credit card number, a payment channel field indicating the channel through which a payment has been made, a transaction confirmation number given to a customer to indicate that a payment has been accepted, and a transaction status code indicating the state of a transaction. The location category might include a true geographic point expressed in longitude and latitude and a location bookmark that allows a customer to easily return to a given location. Data elements in the mobile numbers category might include an electronic serial number that uniquely identifies each handset; a mobile directory number, which is the number used to reach a handset; and a mobile system identifier, which is a unique identifier assigned to a customer. The name, address, and telephone number category might include an address, a fax number, a first name, a last name, a middle name, an organization name, a phone number, a postal address, a prefix title name, a professional title name, and a suffix name.

Personally identifiable information is information that can be associated with one specific individual. Examples of data in the personally identifiable profile category include a personally identifiable cookie field to hold personally identifiable web-based cookies; a cumulative duration of service field to indicate the total length of time that a customer has had service with a service provider; a current duration of service field to indicate the current length of time that a customer has had service with a service provider; a current session field to indicate the length of time that a customer has been logged on with the service provider; email attachment size; email attachment type; an emails received count to indicate the total number of emails received by a customer in a given period of time; an emails sent count to indicate the total number of emails sent by a customer in a given period of time; an emails stored count to indicate the total number of emails stored by a customer; a game play end date and time; a game play start date and time; a number of games downloaded; a prior session field to indicate the number of times a customer has logged on with a service provider; a rate plan field; a total create you own ringers number, which is the number of ringers a customer has created in a given time period; a total customer bookmark number; a total customer purchased amount, which is the number of dollars a customer has spent via the wireless web in a given time period; a total customer purchases transaction count, which is the number of purchasing transactions conducted by a customer in a given time period; a total downloaded images number; a total downloaded ringers number; a total email storage used field; a total vault space used field; and a web activity field, which indicates the web sites visited by a customer during a given session.

Among the data elements in the non-personally identifiable profile category are a bytes sent field, which is the number of bytes of information sent as part of a communication with a wireless telephony service; a non-personally identifiable cookie field to hold non-personally identifiable web-based cookies; a game downloaded count, which is the total number of times a particular game was downloaded in a particular time period by all customers of a particular service; an http access request field; an http access response field; a system time and date field; a TCP/IP (transmission control protocol/internet protocol) address field; a user agent field that contains information on the web browser and operating system used by a handset; a WAP (wireless application protocol) session ID field; and a total wireless web user count, which specifies the total number of subscribers who had wireless web usage during a given time frame.

Data elements in the personally owned category might include an address book, which is a means for a customer to store names, telephone numbers, postal addresses, email addresses, and other information; a calendar entry in which a customer can keep track of important dates; a buddy list; a create your own ringer field in which a customer can store the ringing sound for a handset; a customer web site URL field in which the Uniform Resource Locator for a customer's web site is stored; a digital image field for storing digital images; an email attachment object field for objects that are contained within an email; a games field for games downloaded from the web; an image field for images such as screen savers; a profile name; a ringtones field for ringing sounds a customer has purchased for a handset; a route field, which can hold a description of a route between two geographical points; and a voice recorded name field, which is a sound file of the customer's name as spoken by the customer. The preferences and subscriptions category might include a personal profile containing personal information that a customer has made available to the public, a preferences field containing settings that allow a customer to customize the information displayed on a handset when it is logged in to the web, and a services subscribed to field that lists the services that a customer subscribes to.

Among the data elements in the public space category are a bulletin board, which is a web-based location where customers can post information in free-form text; a chat provider name, which is the name of an organization providing chat room capabilities; a chat room, which is a site where customers can conduct interactive online communication that permits typed conversations to occur in real time; and an instant message provider name, which is the name of an organization providing instant messaging capabilities. The SSN/TIN category can include a customer's Social Security number and a Taxpayer Identification Number, which is an identifying number assigned to a taxpayer. Data elements that might appear in the technical data category include a computing device field, which specifies the type of device a customer uses to access a service provider's computer network; an operating system field, which specifies the operating system used by the customer; a local time zone field, which specifies a customer's current time zone; and fields for the screen depth, screen resolution, and screen size of a customer's handset.

The data categories described above and the data elements within the categories comprise only one embodiment of a system for organizing data related to customers of a wireless telephony service. Other data categories and other data elements within the categories could be used in other embodiments. Also, it should be clear that other names for the categories and data elements could be used. In addition, data categories with similar characteristics can be grouped together in higher-level classifications.

A set of roles can be defined that cover all the circumstances under which an individual or group might wish to gain access to customer data. In an embodiment, the roles are account holder, subscriber, customer, third-party application provider, wireless telephony service provider as application provider, trusted business partner of a wireless telephony service provider, wireless telephony service provider as miner of data, wireless telephony service provider as troubleshooter, wireless telephony service provider as database administrator, internal application of a wireless telephony service provider, enterprise customer/corporate liable account, enterprise customer/employee liable account, enterprise customer/corporate managed-employee liable, and law enforcement.

An account holder is a person who is billed for a wireless telephony service and is responsible for payment. A subscriber is a person who has subscribed to a wireless telephony service. Multiple subscribers may be associated with an account and each may subscribe to different services. A customer can be either an account holder or a subscriber.

A third-party application provider is a content or service provider, other than the primary wireless telephony service provider, whose application requests customer information from the wireless telephony service provider. The third party typically has a contract with the wireless telephony service provider permitting access to the information and typically needs permission from the customer to obtain information. The wireless telephony service provider can also act in the role of application provider when it provides services, such as location-based services, in addition to the telephony service itself. These additional services would typically be treated in the same manner as third-party applications with respect to customer information. A wireless telephony service provider may contract with a vendor to provide services on behalf of the provider. In this case, the vendor would take on the role of a trusted business partner.

A wireless telephony service provider acts as a miner of data when it undertakes internal analysis and reporting of customer data such as wireless web activity. A wireless telephony service provider can act as a troubleshooter when it receives a request from a customer to assist in resolving problems associated with the provider's applications. When a wireless telephony service provider provides maintenance and support of a database of customer data, the provider takes on the role of database administrator. Internal applications within a wireless telephony service provider, such as a billing system, might need to gain access to customer data and can be given a role to do so.

The role of enterprise customer/corporate liable account refers to a business customer that owns an account under which multiple lines are used by employees but where the business customer, not the individual employees, is responsible for bill payment. The role of enterprise customer/employee liable account applies to a situation in which an employee is an account holder and is responsible for payment. The role of enterprise customer/corporate managed-employee liable refers to a situation where an employee is an account holder and is responsible for payment even if the employee uses corporate resources to pay the account.

The law enforcement role refers to federal, state, and local law enforcement agencies presenting a lawful request for information, such as a subpoena, warrant, or court order.

The set of roles described above illustrates one way in which roles can be assigned to the entities that might request access to private customer data. Other roles could be used in other embodiments but, regardless of the actual roles that are used, the same set of roles would apply to all data categories. Also, it should be clear that other names for the roles could be used. In addition, roles with similar characteristics can be grouped together in higher-level classifications.

Several examples can illustrate the manner in which a role may or may not be given access to a data element in a data category. The first example deals with information in the account data category. An account holder is given access to all of the data elements in the account category, but the subscribers under the account holder are not given access without permission from the account holder. Account category information is not available to third-party applications or to the wireless telephony service provider acting as an application provider. Account information can be disclosed to a trusted business partner to complete a service request from a customer. When the wireless telephony service provider acts as a data miner it can collect account information for internal analysis at an aggregate level, but not at a personally identifiable level. The wireless telephony service provider is allowed to view account information at a personally identifiable level when acting as a troubleshooter on a request from a customer for service. When acting as a database administrator, the wireless telephony service provider can view account information at a personally identifiable level. Internal applications can have access to account information as needed to provide service to the customer. Account information is not available to corporate liable, employee liable, or corporate managed-employee liable enterprise customers unless consent is obtained from the customer. Entities filling a law enforcement role are entitled to account information upon request.

An embodiment of the communications data category can be used as another example. Subscribers have access to data in the communications category but an account holder does not have access to the subscribers' personally identifiable information. Personally identifiable communications data cannot be shared with third-party applications or with the wireless telephony service provider acting as a third-party service provider unless the customer has opted in to the disclosure. A trusted business partner can be given access to communications data as necessary to complete a request from a customer. The wireless telephony service provider is not allowed to view communications information in the role of data miner, troubleshooter, database administrator or internal application. Communications information is not available to corporate liable, employee liable, or corporate managed-employee liable enterprise customers unless consent is obtained from the customer. Entities filling a law enforcement role are entitled to communications information upon request.

These examples illustrate a few of the privacy constraints that may exist in the CDPM system for a few roles with respect to a few categories of data. In other embodiments, there may be other constraints, other roles, and other data categories. Regardless of the specific constraints, roles, and categories, for every element of private customer data at least one privacy rule exists defining an authorization level that at least one role has for access to the data element.

Figure 4:
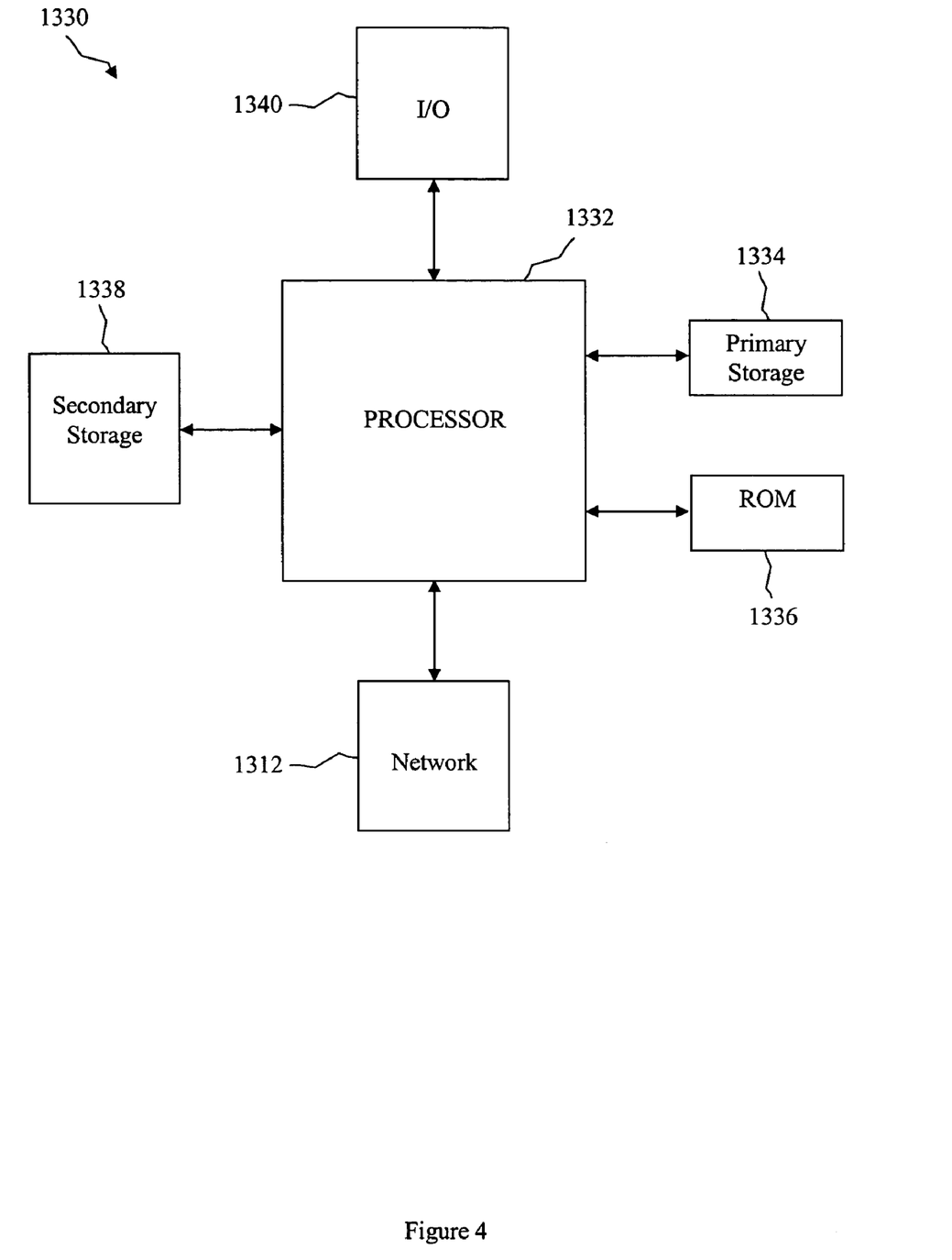
FIG. 4 is a block diagram of a typical computer system.

A data structure for a customer data privacy management system as described above may generally be implemented on a variety of different computer systems. FIG. 4 illustrates a typical, general-purpose computer system suitable for implementing the present invention. The computer system 1330 includes a processor 1332 (also referred to as a central processing unit or CPU) that is coupled to memory devices including primary storage devices 1336 (typically a read only memory, or ROM) and primary storage devices 1334 (typically a random access memory or RAM).

As is well known in the art, ROM acts to transfer data and instructions uni-directionally to CPU 1332, while RAM is used typically to transfer data and instructions in a bi-directional manner. Both storage devices 1334 and 1336 may include any suitable computer-readable media. A secondary storage medium 1338, which is typically a mass memory device, is also coupled bi-directionally to CPU 1332 and provides additional data storage capacity. The mass memory device 1338 is a computer-readable medium that may be used to store programs including computer code, data, and the like. Typically, mass memory device 1338 is a storage medium such as a non-volatile memory such as a hard disk or a tape which is generally slower than primary storage devices 1334 and 1336. Mass memory storage device 1338 may take the form of a magnetic or paper tape reader or some other well-known device. It will be appreciated that the information retained within the mass memory device 1338 may, in appropriate cases, be incorporated in standard fashion as part of RAM 1334 as virtual memory. A specific primary storage device 1334 such as a CD-ROM may also pass data uni-directionally to the CPU 1332.

CPU 1332 is also coupled to one or more input/output devices 1340 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1332 optionally may be coupled to a computer or telecommunications network, e.g., an internet network, or an intranet network, using a network connection as shown generally at 1312. With such a network connection, it is contemplated that CPU 1332 might receive information from the network, or might output information to the network in the course of performing the above-described method steps. Such information, which is often represented as a sequence of instructions to be executed using CPU 1332, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on multiple CPUs, as for example a CPU in communication across network connections. Specifically, the above-described method steps may be performed across a computer network. Additionally, it will be recognized by one of skill in the art that the above method steps may be recognized as sets of computer codes and that such computer codes are typically stored in computer readable media such as RAM, ROM, hard discs, floppy discs, carrier waves, and the like.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A method for managing customer data comprising:
   assigning one or more roles with entities requesting access to private customer data, the entities including at least one application;
   determining a category associated with at least some of the customer data;
   determining an access level for each of the one or more roles based on the category associated with the at least some of the private customer data, wherein the access level for each of the one or more roles is further based on one of one or more rules regulating accessing the private customer data, wherein each of the one or more rules corresponds with one of the one or more roles and the category, and wherein the one or more rules regulating accessing the private customer data are selectable by a customer related to the private customer data; and
   restricting access by the entity to a system maintaining the private customer data based on whether the entity is authorized to access the system.

2. The method of claim 1, further comprising:
   identifying one or more entities for which access to customer data is to be provided;
   determining the roles associated with the entities; and
   assigning some of the entities to one of the defined roles.

3. The method of claim 1, wherein the private customer data includes customer mobile telephony data.

4. The method of claim 3, wherein the mobile telephony data includes a geographic location of the customer.

5. The method of claim 4, wherein at least one of the entities requesting access to the private customer data based on a vendor providing a coupon to the customer based on geographic location data of the customer mobile telephony data.

6. The method of claim 5, wherein the one of the one or more rules is further defined as a customer selectable rule related to providing the geographic location data of the customer.

7. The method of claim 1, wherein the one of the one or more rules is further defined as a legal constraint operable to limit access to customer data.

8. The method of claim 1, wherein the one of the one or more rules is further defined as a privacy constraint on customer data access based on at least a portion of a legal notice requirement.

9. The method of claim 1, wherein the one of the one or more rules is further defined as a privacy constraint on customer data access based on at least a portion of a legal choice requirement.

10. The method of claim 1, wherein the one of the one or more rules is further defined as an opt-in/opt-out legal choice requirement that is customer selectable.

11. The method of claim 1, wherein the one of the one or more rules is further defined as a privacy constraint on customer data access based on at least a portion of a legal access requirement.

12. The method of claim 1, wherein the one of the one or more rules is further defined as a privacy constraint on customer data access based on at least a portion of each of a notice, a choice, an access and a security requirement.

13. A system for privacy management of customer data comprising:
   a data store component configured to maintain a data store identifying private customer data and an authorization level associated with at least some of the private customer data, at least some of the private customer data securely stored according to a security protocol, wherein the authorization level associated with at least some of the private customer data is based on one or more rules selectable by a customer related to the private customer data; and a data retriever component configured to receive a request from an application for the private customer data, and the data retriever component determines whether to provide the requested private customer data to the application based on a role assigned to the application and the authorization level associated with the requested private customer data, wherein there is one-to-one-to-one correspondence between the requested private customer data, the role assigned to the application and the authorization level.

14. The system of claim 13, wherein the data store further identifies a category associated with at least some of the private customer data and wherein the authorization level is associated with the category.

15. The system of claim 13, wherein the role is further defined as a classification role of an entity desiring to receive the private customer data.

16. The system of claim 15, wherein the authorization level is associated with the role.

17. The system of claim 15, wherein the authorization level is based on the category and the role.

18. The system of claim 13, wherein the security protocol includes a security parameter related to a type of security storage of the private customer data on a system and a retention parameter related to retention of the private customer data.

19. The system of claim 13, further comprising a network authentication system configured to authenticate the application for access to a network wherein the data store is located.

20. The system of claim 13, wherein the application is associated with a service.

21. The system of claim 20, wherein the data retriever component is further configured to determine whether to provide the requested private customer data to the application based on the role related to the service of the application.

22. The system of claim 20, wherein the data retriever component is further configured to determine whether to provide the requested private customer data to the application based the service of the application.

23. The system of claim 22, wherein the data retriever component is further configured to determine whether to provide the requested private customer data to the application based on the role assigned of the application.

* * * * *